USO10521114B2

United States Patent
Thomas

(10) Patent No.: US 10,521,114 B2
(45) Date of Patent: Dec. 31, 2019

(54) ADDING OR REMOVING A STORAGE PROVIDER IN UNIFIED STORAGE MANAGER

(71) Applicant: Red Hat, Inc., Raleigh, NC (US)

(72) Inventor: Nishanth Thomas, Karnataka (IN)

(73) Assignee: Red Hat, Inc., Raleigh, NC (US)

( * ) Notice: Subject to any disclaimer, the term of this patent is extended or adjusted under 35 U.S.C. 154(b) by 145 days.

(21) Appl. No.: 15/054,916

(22) Filed: Feb. 26, 2016

(65) Prior Publication Data

US 2017/0249088 A1    Aug. 31, 2017

(51) Int. Cl.
| | |
|---|---|
| *G06F 3/06* | (2006.01) |
| *G06F 13/16* | (2006.01) |
| *G06F 9/445* | (2018.01) |
| *G06F 8/65* | (2018.01) |
| *G06F 9/4401* | (2018.01) |

(Continued)

(52) U.S. Cl.
CPC .......... *G06F 3/0607* (2013.01); *G06F 3/0632* (2013.01); *G06F 3/0685* (2013.01); *G06F 3/067* (2013.01); *G06F 8/65* (2013.01); *G06F 9/4411* (2013.01); *G06F 9/44505* (2013.01); *G06F 13/1694* (2013.01); *G06F 15/7867* (2013.01); *G06F 15/7871* (2013.01); *G06F 21/6218* (2013.01)

(58) Field of Classification Search
CPC .... G06F 9/44505; G06F 8/65; G06F 15/7867; G06F 9/4411; G06F 17/30345; G06F 15/7871; G06F 13/1694; G06F 3/067; G06F 21/6218; G06F 17/30572; G06F 17/30194

See application file for complete search history.

(56) References Cited

U.S. PATENT DOCUMENTS

| | | |
|---|---|---|
| 8,037,260 B2 | 10/2011 | Shitomi et al. |
| 8,122,114 B1 | 2/2012 | Krishnamoorthy et al. |

(Continued)

FOREIGN PATENT DOCUMENTS

CN        104486110 A        4/2015

OTHER PUBLICATIONS

Krischer, Josh, "Hitachi Unified Storage: One Platform for Block, File and Object", https://www.hds.com/assets/pdf/analyst-report-krisher-hus-one-platform-for-block-file-and-content.pdf, Apr. 2012, 25 pages.

(Continued)

*Primary Examiner* — Ji H Bae
(74) *Attorney, Agent, or Firm* — Lowenstein Sandler LLP

(57) ABSTRACT

A method of implementations includes receiving, by a processing device executing a unified storage manager (USM), an update package comprising a configuration file for a storage service to add to the USM, adding, by the processing device, the configuration file to a set of configuration files maintained by the USM, responsive to detecting the addition of the configuration file, causing, by the processing device, a re-load of the set of configuration files at the USM without a shutdown and re-start of the USM, loading, by the processing device, the configuration file in the USM, and initializing, by the processing device, an adaptor component for the storage service at the USM, the adaptor component comprising a set of application programming interface (API) methods for the USM to communicate with the storage service.

20 Claims, 5 Drawing Sheets

(51) Int. Cl.
*G06F 21/62* (2013.01)
*G06F 15/78* (2006.01)

(56) References Cited

U.S. PATENT DOCUMENTS

| | | | |
|---|---|---|---|
| 8,433,877 B2 | 4/2013 | Bargoti et al. | |
| 8,516,044 B1 | 8/2013 | Chakraborty et al. | |
| 9,819,732 B2* | 11/2017 | Deulgonnkar | |
| 2003/0182362 A1 | 9/2003 | Jensen et al. | |
| 2008/0222223 A1* | 9/2008 | Srinivasan | H04L 41/0803 |
| 2013/0311520 A1* | 11/2013 | Nakagawa | G06F 3/0607 |
| | | | 707/812 |
| 2013/0332610 A1 | 12/2013 | Beveridge | |
| 2014/0237070 A1 | 8/2014 | Choi et al. | |
| 2014/0344565 A1* | 11/2014 | Wu | G06F 8/65 |
| | | | 713/100 |
| 2015/0058314 A1* | 2/2015 | Leclerc | G06F 17/30575 |
| | | | 707/711 |
| 2017/0139725 A1* | 5/2017 | Koufogiannakis | G06F 9/44505 |

OTHER PUBLICATIONS

"Custom Amazon S3 Provider", http://docs.telerik.com/devtools/aspnet-ajax/controls/cloudupload/custom-cloud-storage-providers/custom-amazon-s3-provider, Feb. 9, 2016, 5 pages.

"Storage Support", https://jujucharms.com/docs/1.25/storage, Feb. 9, 2016, 7 pages.

"Register Storage Providers", https://pubs.vmware.com/vsphere-55/index.jsp?topic=%2Fcom.vmware.vsphere.storage.doc%2FGUID-B50E19138-C1AD-4FE1-AD90-4DD6D29831FE.html, 1 page.

Dolan, Kerry and Palmer, Tony, "Hitachi Unified Storage VM and Hitachi Command Suite", http://www.esg-global.com/lab-reports/hitachi-unified-storage-vm-and-hitachi-command-suite/, Mar. 14, 2013, 36 pages.

* cited by examiner

ADDING OR REMOVING A STORAGE PROVIDER IN UNIFIED STORAGE MANAGER

TECHNICAL FIELD

This disclosure relates to computing resources, and more particularly, to adding or removing a storage provider in a unified storage manager (USM).

BACKGROUND

Growth of data in many industries is overwhelming hardware-based storage. Software-defined storage platforms provide a solution for scaling storage across physical, virtual, and cloud resources. There are various storage providers that can be used for software-based storage services. These storage providers have different features and properties. Currently, interacting with a particular storage provider entails knowledge of the specific features of the underlying storage service. Moreover, when a system administrator wants to add or remove a new storage provider, the system administrator should know the features of this new storage provider and how adding or removing the storage provider affects the entire system. The system administrator also has to manually adjust the system to allow for the addition or removal of the new storage provider.

DESCRIPTION OF DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Figure 1:
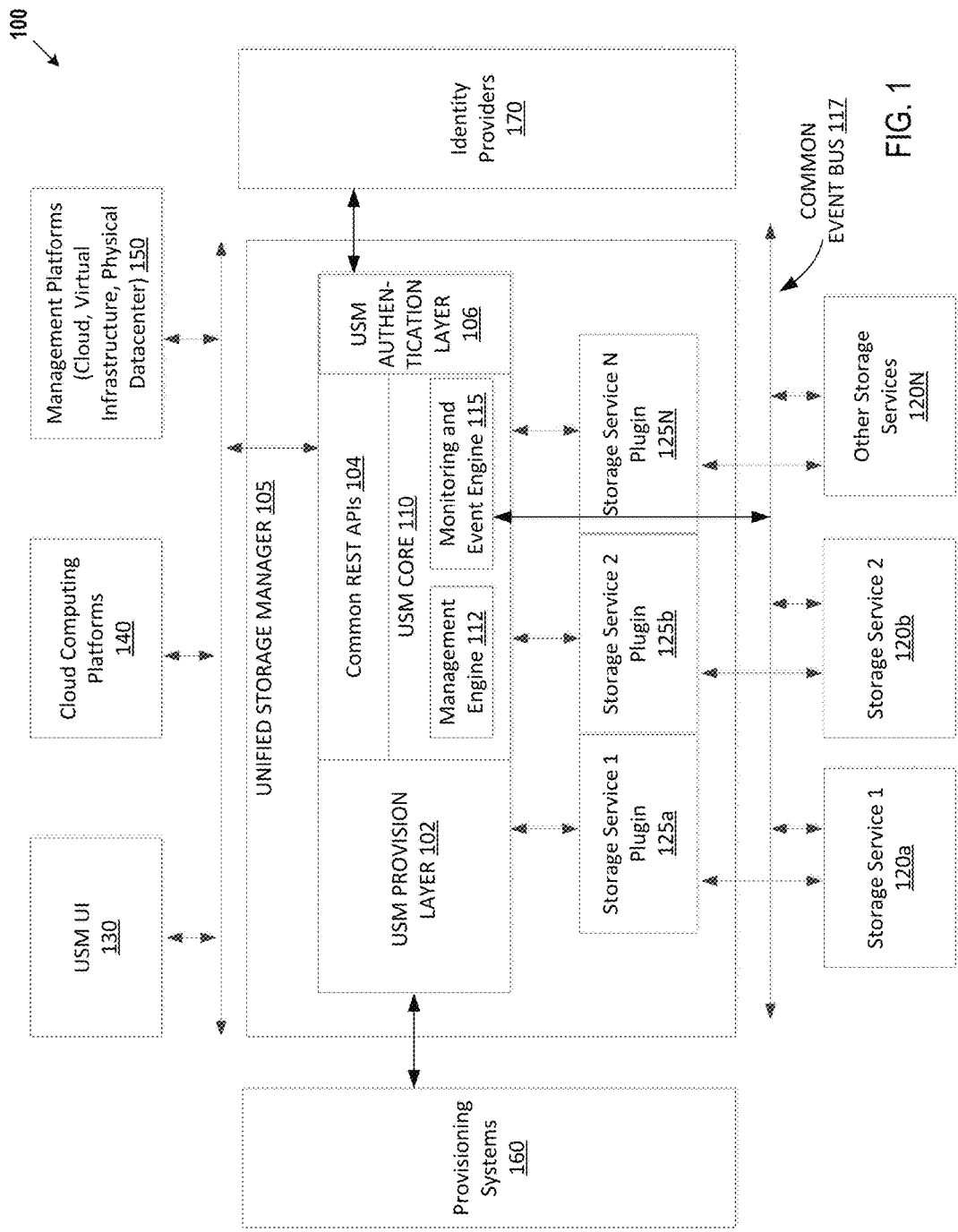
FIG. 1 is a block diagram that shows an example of a system architecture for a unified storage manager (USM).

Aspects and implementations of the disclosure are directed to adding or removing a storage provider in a unified storage manager (USM). The USM is a storage management application that provisions, manages, and monitors multiple disparate storage providers. A storage provider may also be referred to herein as a storage service, and may include a scalable file system such as Gluster® file system, Ceph® file system, or any other scalable, distributed software-based storage service. The USM is designed so that the storage services implement the business logic specific to the file system technology areas. Each storage service executes as a separate process in the USM that is started and managed by a management engine of the USM. In one implementation, the separate process is a storage service adaptor component (e.g., a plugin component, a module, an application, etc.) corresponding to the storage service, wherein the adaptor component provides application programming interface (API) methods enabling communication between the USM and the storage service.

In one implementation, the management engine of the USM enables the addition of new storage services to the USM. The USM provides a loosely-coupled architecture so that storage services that the USM manages can be easily added or removed without affecting the core functionality of the USM. When a new storage service is to be added to the USM, the USM can be updated to include functionality to support management of the new storage service. To add support for the new storage service, an update file (or any other data structure such as a database, a database table, etc.) for the USM can be provided. The update file may include a new configuration file (or any other data structure such as a database, a database table, etc.) corresponding to the new storage service. The new configuration file is added to a set of configuration files (or any other data structures such as databases, database tables, etc.) maintained by the management engine.

The addition of a new configuration file causes the USM to re-load a set of configuration files maintained by the USM. In one implementation, when the USM detects the addition of the new configuration file, a management engine of the USM triggers the re-load process for the configuration files of the USM. As part of re-loading the configuration files, each configuration file is examined and the new configuration file for the new storage provider is detected. The new configuration file is then loaded and installed in the USM, causing an adaptor component corresponding to the new storage service to initialize on the USM. This adaptor component may be a plugin component that enables communication between the USM and the new storage service. The loading and installation of the new configuration file occurs in the USM without causing a shutdown and/or re-start of the USM system.

Conventional storage system solutions rely on manual adjustments of the storage management system to allow for the addition or removal of a new storage provider. In addition, the system administrator should be knowledgeable of the features of the new storage provider and how adding the new storage provider affects the entire storage management system. This is a complicated and error-prone task. Furthermore, conventional storage system solutions involve a shutdown and re-start of the storage management system each time a new storage provider is added or removed. Implementations of the disclosure can provide a management engine of a USM that adds or removes a storage provider to the USM without relying on manual adjustments of the storage management system and without having to shutdown and/or re-start the USM.

FIG. 1 is an example system architecture 100 in which implementations of the disclosure can be implemented. The system architecture 100 can include a unified storage manager (USM) 105. The USM 105 can be implemented on one or more machines (e.g., server computers, desktop computers, etc.). The USM 105 deploys, manages, and monitors multiple different storage providers. Example storage providers can include Gluster® file system (FS), Ceph® storage, and so on. Storage providers may be referred to herein as storage services. As illustrated in FIG. 1, USM 105 is communicably coupled to multiple storage services, such as storage service 1 120*a*, storage service 2 120*b*, and other storage services 120N.

The USM 105 provides a pluggable framework to allow for interaction with each of the storage services 120*a*-120N. A pluggable framework refers to the USM 105 providing plugin components 125*a*-125N that communicate (e.g., via remote procedure calls (RPC) APIs) with the corresponding storage services 120a-120N. A plugin refers to a component that adds a specific feature to an existing computer program. The USM 105 provides services that the plug-in 125a-125N can use, including a way for the plugin 125a-125N to register itself with the USM 105 and a protocol for the exchange of data with the plugin 125a-125N. In some implementations, plugin component 125a-125N is referred to as an adaptor component that generally refers to a device (which may be implemented as executable code, hardware, etc.) that enables normally incompatible components to work together.

USM 105 also manages configuration of underlying storage nodes (not shown) of the storage services 120a-120N. A storage node may be a physical computing machine with its own local persistent storage, either disk or solid state, and may also include a CPU with one or more cores, memory, and an Internet Protocol (IP) address. Storage nodes may be provisioned to provide storage for a storage service, such as any of storage services 120a-120N, managed by the USM 150. Storage nodes may be part of one or more logical resources (e.g., cluster, volume, block, disk, brick, etc.) of the storage service 120a-120N to which the storage node is provisioned.

USM 105 may be communicably coupled to storage services 120a-120N and their underlying storage nodes and storage entities, as well as to other external providers (e.g., external provisioning systems 160, external identity providers 170, etc.) via a communication interface such as a bus or a network. The network may be a private network (e.g., a local area network (LAN), a wide area network (WAN), intranet, or other similar private networks) or a public network (e.g., the Internet).

USM 105 exposes application programming interfaces (APIs) 104, such as Representational State Transfer (REST) APIs 104, which are consumed via USM user interface (UI) 130 and by other USM 105 customers, such as cloud computing platforms 140 and other management platforms 150. One example cloud computing platform 140 may include Red Hat® OpenStack®. An example management platform 150 may include Red Hat® CloudForms®. USM 105 implements all framework-level functionalities such as authentication, authorization logging, and so on.

USM 105 includes a USM provisioning layer 102 that is responsible for provisioning storage nodes for use by the storage services 120a-120N. The provisioning layer 102 handles providing the storage nodes with operating system, file system, and storage software packages to be consumed by users. USM provision layer 102 enables provisioning a storage node through external provision systems 106, such as Satellite®, Puppet®, and Foreman®, to name a few examples. The USM provisioning layer 102 and the external provision systems 160 may communicate via APIs. USM 105 provides a pluggable framework through which any external provision system can be integrated.

USM 105 also includes a USM authentication layer 106 that is responsible for identifying individuals in a system and controlling their access to resources within or across enterprise boundaries by associating user rights and restrictions with the established individual. The USM authentication layer 106 enables identity management through external identity providers 180, such as IPA®, OpenLDAP®, Directory Server®, and AD®, to name a few examples. The USM authentication layer 106 and the external identity providers 170 may communicate via APIs. USM 105 provides a pluggable framework through which any external identity provider can be integrated.

USM 105 includes a USM core 110 having a management engine 112 that manages the configuration of underlying storage nodes utilized by the storage services 120a-120N. Management engine 112 manages configuration of storage nodes through providers of storage services 120a-120N. Generic APIs like host management, authentication, and authorization are implemented in the USM core 110. However, the provider-specific API requests are routed to the respective providers of storage services 120a-120N via the corresponding storage service plugins 125a-125N for those storage services 120a-120N.

In one implementation, USM core 110 may execute a HyperText Transfer Protocol (HTTP) server that receives REST requests, which are parsed and routed to appropriate modules of the USM 105 (e.g., core modules 112, 115, USM provisioning layer 102, USM authentication layer 106, or the respective storage service plugins 125a-125N). In the case of synchronous requests, the USM core 110 waits for the completion of the request, forms an HTTP response, and sends it back to the caller. Asynchronous requests return immediately with a task ID. The user can query the status of the task using the REST APIs provided. The USM core 110 may also implement a data store service, such as Mongodb®, for persisting the configurations of various storage entities.

USM core 110 further includes a monitoring and event engine 115 that ensures the performance of storage nodes and storage entities at acceptable levels, as well as recognizes, isolates, and logs faults that occur at the storage node and storage entity levels. In one implementation, the monitoring and event engine 115 of USM core 110 enables alerting and notifying a USM 105 user (e.g., a system administrator) of changes (i.e., events) occurring in underlying storage services 120a-120N. Events may include malfunctions and/or faults in an underlying storage node or storage entity (e.g., faults in any of files, cluster, volumes, blocks, bricks, etc.) and changes in functioning of physical resources (e.g., CPU utilization, memory utilization, load, etc. exceeding threshold performance levels) of the storage nodes of a storage service 120a-120N. Storage services 120a-120N may collect and send events via a common event bus 117 that passes the events to the monitoring and event engine 115.

In one implementation, management engine 112 of USM core 110 enables the addition and/or removal of storage services 120a-120N to the USM 105. The USM 105 provides a loosely-coupled architecture so that storage services 120a-120N the USM 105 manages can be easily added or removed without affecting the core functionality of the USM 105. The USM 105 is designed so that the storage services 120a-120N implement the business logic specific to the file system technology areas. Each storage service 120a-120N executes as a separate process in the USM that is started and managed by the management engine 112. In one implementation, the separate process is the storage service plugin 125a-125N corresponding to the storage service 120a-120N. Further description of the management engine 112 and the addition or removal of storage services 120a-120N by the management engine 112 is provided below with respect to FIG. 2

Figure 2:
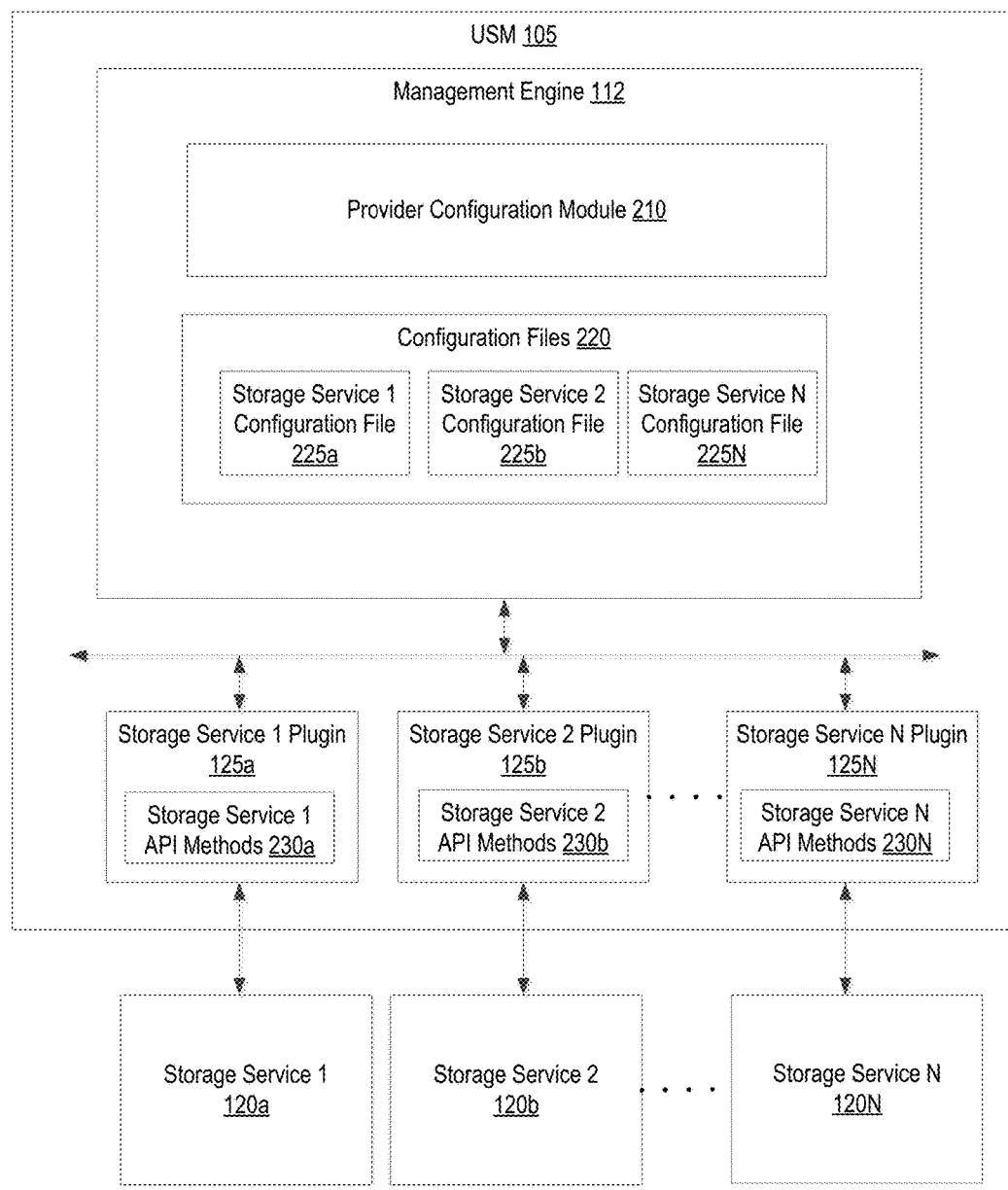
FIG. 2 is a block diagram that shows an example of a management engine of an USM architecture.

FIG. 2 is a block diagram of management engine 112 according to implementations of the disclosure. In one implementation, management engine 112 is the same as its counterpart described with respect to FIG. 1. Management engine 112 may be communicably coupled to storage services 120a-120N, which may be the same as their counterparts described with respect to FIG. 1. Management engine 112 includes a provider configuration module 210 and a set of configuration files 220. Each storage service 120a-120N provides a configuration file 225a-225N to the USM 105 to maintain as part of the set of configuration files 220. The provider configuration module 210 uses the configuration files 225a-225N to start the storage service 120a-120N and initialize configurations for the storage service 120a-120N. The configuration file 225a-225N for each storage service 120a-120N contains basic information about the storage service 120a-120N and the technology-specific routes (i.e., endpoints) it supports. An example configuration file is shown below:

```
{
    "plugin": {
        "name": "ceph",
        "pluginBinary": "/var/lib/skyring/providers/
        ceph_provider",
    },
    "plugin_config": {
        "configFilePath": "placeholder"
    },
    "routes": [
        {
            "name": "CephHello",
            "method": "GET",
            "pattern": "/ceph/hello/{name}",
            "PluginFunc": "SayHi"
        }
    ]
}
```

As depicted above, the example configuration file provides the name and path of the binary file associated with the plugin. In addition, the plugin configuration provides parameters that are of interest to the storage service, but not read by the USM 105. The routes specified in the configuration file provide a list of addition endpoints support by each provider. In one implementation, common endpoints are not specified in the routes of the configuration file, as those common endpoints are maintained by the USM 105.

In one implementation, when a capability to support a new storage service 120a-120N is added to the USM 105, the USM 105 installation executed at a customer can be updated to include the functionality to support management of the new storage service 120a-120N. To add support for the new storage service 120a-120N, the customer would receive an update file for the USM 105. In one implementation, the update file may be in the form of a Red Hat Package Manager (RPM) file. The update file may include a new configuration file 225a-225N corresponding to the new storage service 120a-120N. The new configuration file 225a-225N is added to the configuration files 220 maintained by the management engine 112.

In one implementation, the provider configuration module 210 detects the addition of a new configuration file 225a-225N and causes the USM 105 to re-load its configuration files 220. As part of re-loading the configuration files, the provider configuration module 210 examines each configuration file 225a-225N and determines whether there are dependent configurations that need to be updated or any packages that need to be obtained. When the provider configuration module 210 locates the new configuration file 225a-225N for the new storage provider 120a-120N, the provider configuration module 210 loads the configuration file 225a-225N and installs the specific binary indicated in the configuration file 225a-225N. A binary may refer to a binary file, which is an executable code that describes instructions to perform indicated tasks.

The installation of the binary causes initialization of the corresponding storage service plugin 125a-125N for the new storage service 120a-120N on the USM 105. In one implementation, storage service plugins 125a-125N are the same as their counterparts described with respect to FIG. 1. In implementations of the disclosure, the re-loading of configuration files and initialization of the new storage service plugin 125a-125N occur without a shutdown and/or re-start of the USM 105, and thus do not result in any downtime of the USM 105.

When the new storage service plugin 125a-125N is initialized in the USM 105, the storage service plugin 125a-125N includes an API interface providing a set of methods 230a-230N that the storage service 120a-120N should implement, via the storage service plugins 125a-125N. These API methods 230a-230N are specified in the storage service's corresponding configuration file 225a-225N and enable communication between the USM 105 and the storage service 120a-120N. In one implementation, the storage service API methods 230a-230N are remote procedure call (RPC) API methods. Example generic signatures of RPC methods that may be implemented by storage services 120a-120N are provided below:

Input Parameter:

```
{
    "title": "RPC Input",
    "description": "Input Parameter expected by provider RPC
    methods",
    "type": "object",
    "properties": {
        "rpcrequestvars": {
            "type": "array",
            "description": "Map of parameters and values in the
            request",
            "items": {
                "type": "array",
                "items": [
                    {
                        "key": "string"
                    },
                    {
                        "value": "string"
                    }
                ]
            }
        },
        "rpcrequestdata": {
            "description": "Request body, data structures
            specific to method",
            "type": "object",
            "properties": { }
        }
    }
}
```

Output Parameter:

```
{
    "title": "RPC Output",
    "description": "Output expected from provider RPC methods",
    "type": "object",
    "properties": {
        "Data": {
            "description": "Output Data",
            "type": "object",
            "properties": {
                "result": {
```

-continued

```
                "description": "Response body, data
                    structures specific to method",
                "type": "object",
                "properties": { }
            },
            "requestId": {
                "description": "Id of asynchronous
                    task",
                "type": "string"
            }
        }
    },
    "Status": {
        "description": "Request Status",
        "type": "object",
        "properties": {
            "statuscode": {
                "type": "integer"
            },
            "statusmessage": {
                "type": "string"
            }
        }
    }
}
```

The above generic RPC methods are shown in JavaScript Object Notation (JSON) format for modeling purposes. The generic methods may be converted into specific data structures by the storage services 10a-120N.

Similar to the process for adding a new storage provider 120a-120N, the provider configuration module 210 may also remove a storage service 120a-120N from the USM 105 by removing (i.e., deleting) the configuration file 225a-225N corresponding to the storage service 120a-120N from its maintained set of configuration files 220. The provider configuration module 210 then causes a re-load of the configuration files 220 in order to process the configuration change in the USM 105, without causing a shutdown and re-start of the overall USM system 105. The re-load causes the storage service plugin 125a-125N to be removed from the USM 105.

Figure 3:
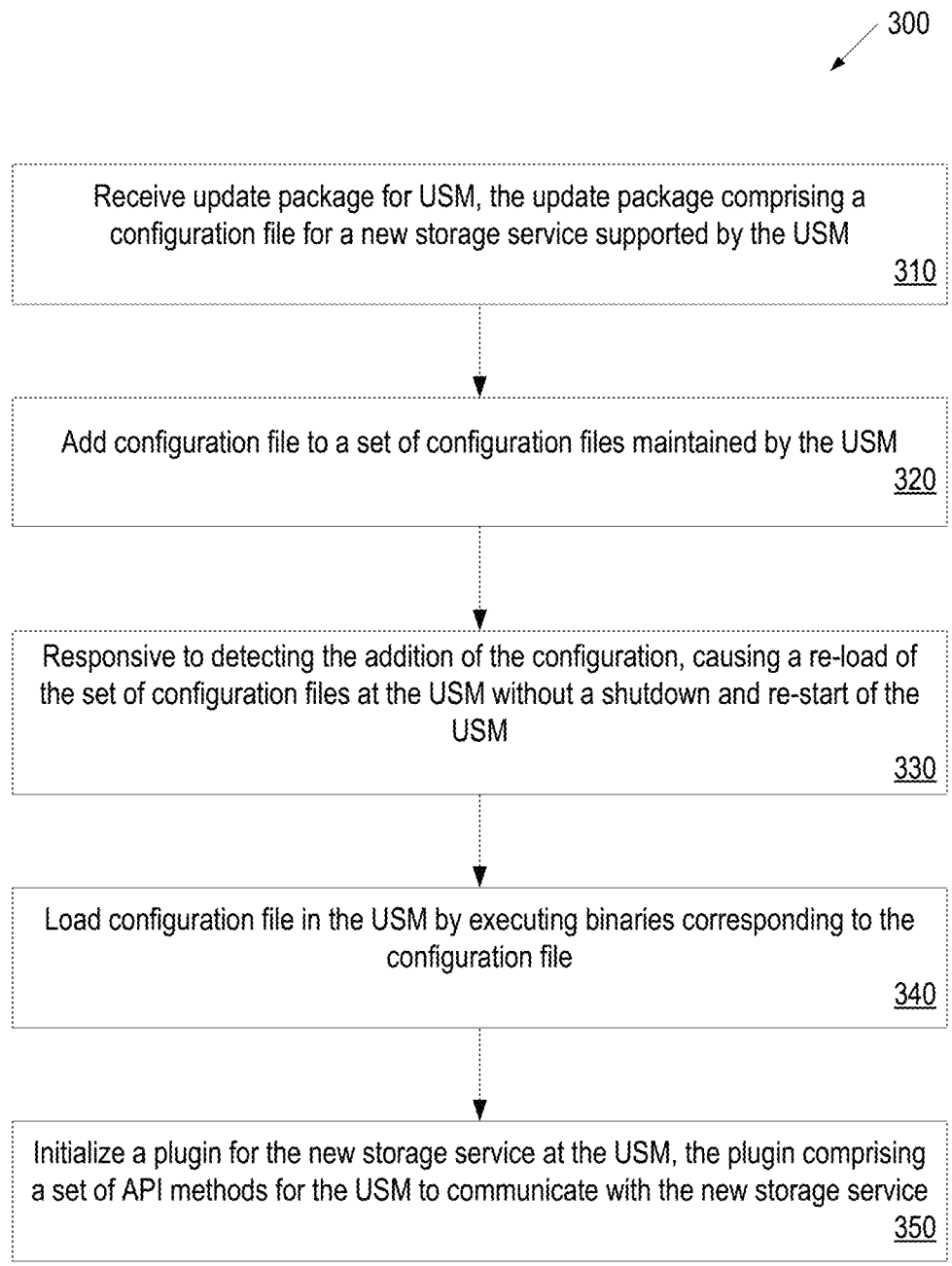
FIG. 3 is flow chart that shows an example of a process for adding a new storage provider in an USM architecture.

FIG. 3 is a flow diagram for a method 300 for adding a new storage provider in a USM, in accordance with one or more implementations of the disclosure. Method 300 can be performed by processing logic that can comprise hardware (e.g., circuitry, dedicated logic, programmable logic, microcode, etc.), software (e.g., instructions run on a processing device), or a combination thereof. In one implementation, method 300 is performed by a management engine (e.g., management engine 112 of FIG. 1) executed by a processing device in a computing machine. At least a portion of method 300 can be performed by the computing machine without user interaction.

At block 310, the processing device receives an update package for the USM. The update package may include a configuration file for a storage service to be added to the USM. At block 320, the configuration file is added to a set of configuration files maintained by the USM. Then, at block 330, responsive to detecting the addition of the configuration file, causing a re-load of the set of configuration files at the USM. In one implementation, the re-load occurs without a shutdown and re-start of the USM. At block 340, the configuration file is loaded in the USM by executing binaries corresponding to the configuration file. Lastly, at block 350, a plugin component for the storage service is loaded at the USM. In one implementation, the plugin component comprises a set of API methods for the USM to communication with the storage service.

Figure 4:
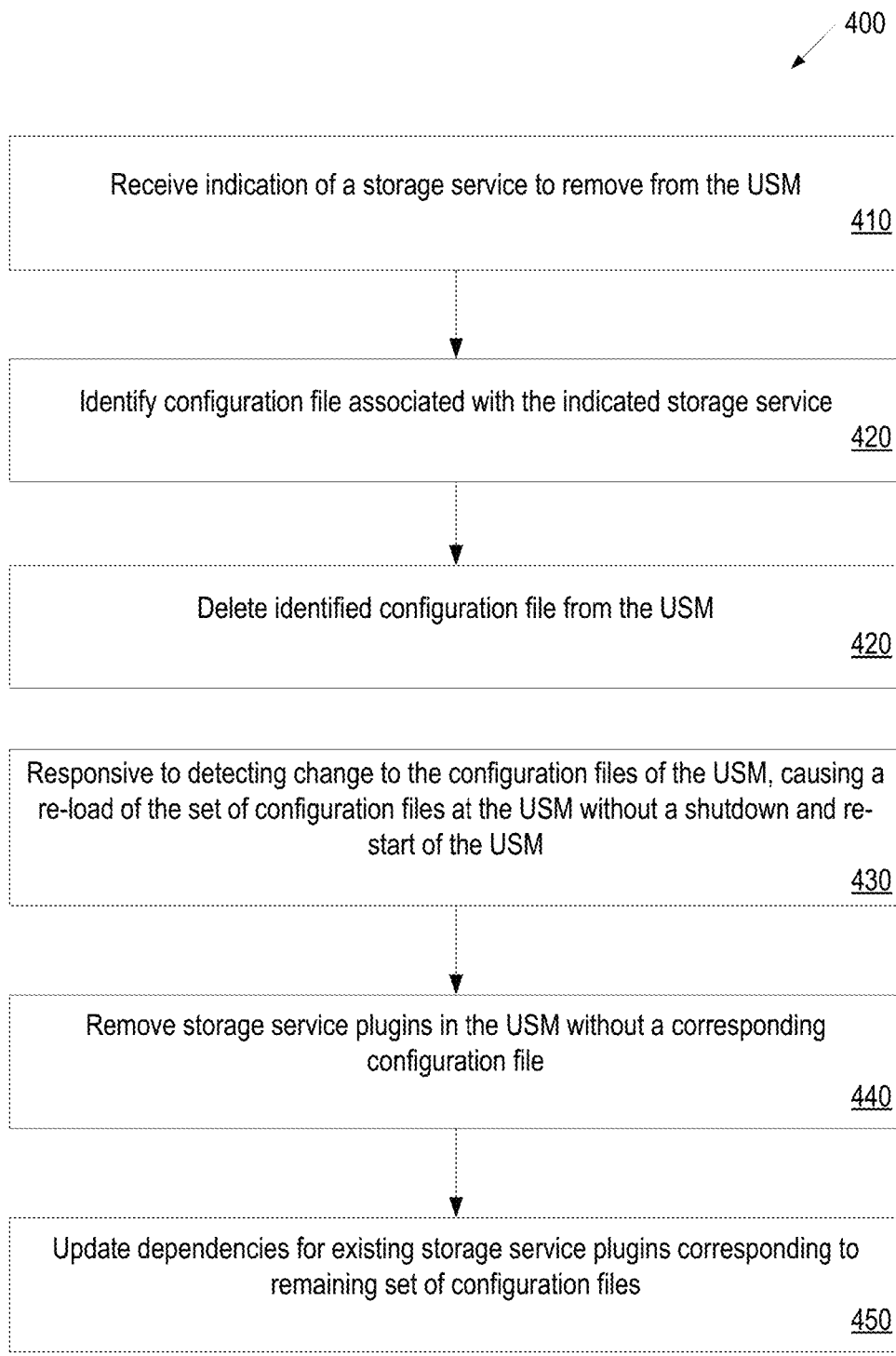
FIG. 4 is flow chart that shows an example of another process for removing a storage provider in an USM architecture.

FIG. 4 is a flow diagram for a method 400 for removing a storage provider in a USM, in accordance with one or more implementations of the disclosure. Method 400 can be performed by processing logic that can comprise hardware (e.g., circuitry, dedicated logic, programmable logic, microcode, etc.), software (e.g., instructions run on a processing device), or a combination thereof. In one implementation, method 400 is performed by a management engine (e.g., management engine 112 of FIG. 1) executed by a processing device in a computing machine. At least a portion of method 400 can be performed by the computing machine without user interaction.

At block 410, the processing device an indication of a storage service to be removed from the USM is received. Then, at block 420, a configuration file associated with the indicated storage service is identified. At block 430, the identified configuration file is deleted from the USM. Subsequently, at block 440, responsive to detecting a change to the set of configuration files maintained by the USM, a re-load of the set of configuration files is caused. In one implementation, the re-load occurs without a shutdown and re-start of the USM. Subsequently, at block 450, a storage service plugin component that does not have a corresponding configuration file in the re-loaded set of configuration files is removed. Lastly, at block 460, dependencies for the existing storage service plugin components corresponding to the remaining set of configuration files are updated.

Figure 5:
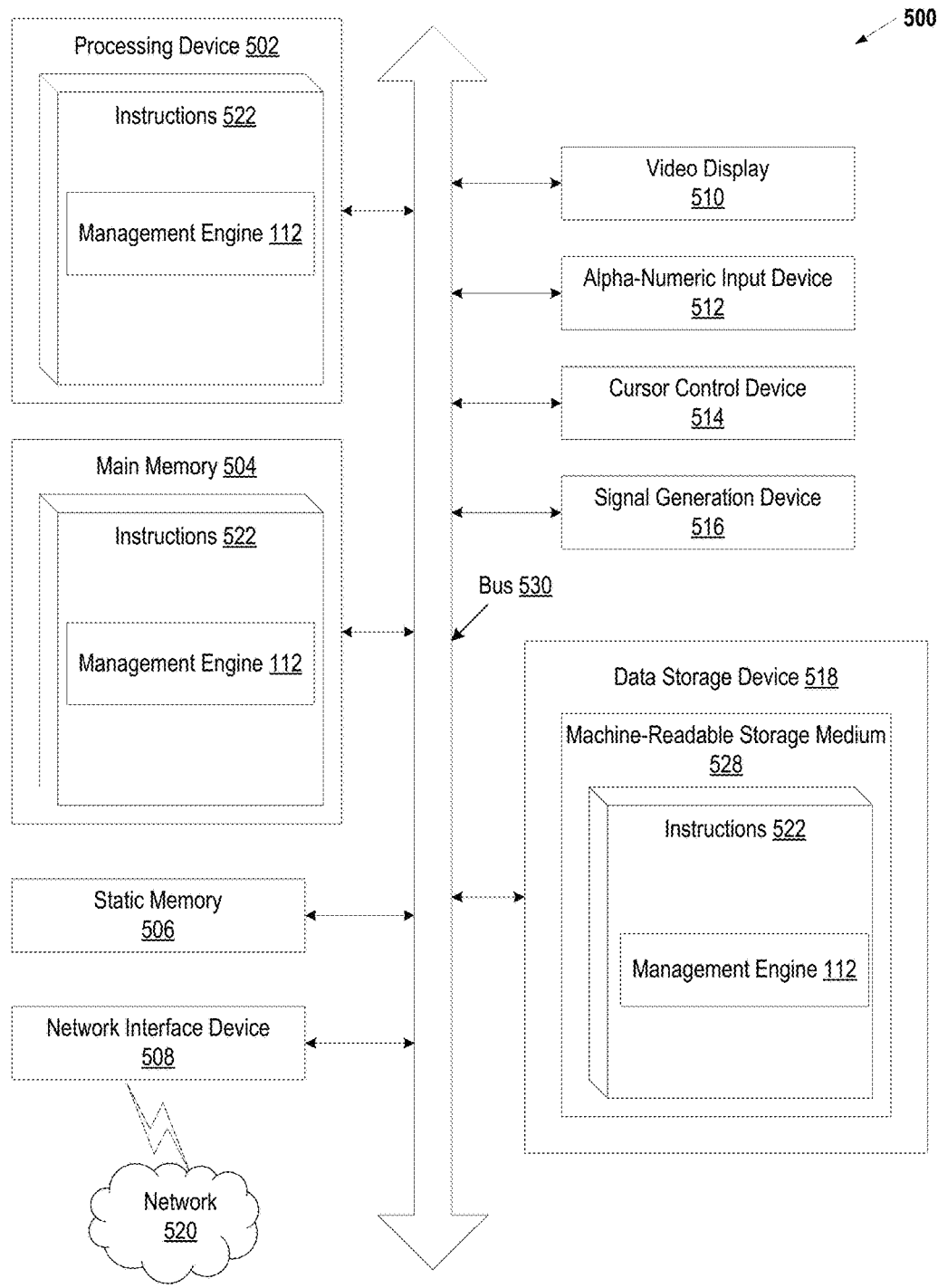
FIG. 5 is a schematic diagram that shows an example of a computing system.

FIG. 5 illustrates an example machine of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or DRAM (RDRAM), etc.), a static memory 506 (e.g., flash memory, static random access memory (SRAM), etc.), and a data store device 518, which communicate with each other via a bus 530.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 502 is to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT), an alphanumeric input device 512 (e.g., a keyboard), a cursor control device 514 (e.g., a mouse), and a signal generation device 516 (e.g., speaker).

The data storage device 518 may include a machine-readable storage medium 528 (also known as a computer-readable medium) on which is stored one or more sets of instructions or software 522 embodying any of the methodologies or functions described herein. The instructions 522 may also reside, completely or at least partially, within the main memory 504 and/or within the processing device 502 during execution thereof by the computer system 500, the main memory 504 and the processing device 502 also constituting machine-readable storage media.

In one implementation, the instructions 522 include instructions for management engine 112 (e.g., management engine 112 of FIG. 1), and/or a software library containing methods that call the management engine 112. While the machine-readable storage medium 528 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the disclosure. The term "machine-readable storage medium" shall accordingly be taken to include, but not be limited to, solid-state memories, optical media and magnetic media.

In the foregoing description, numerous details are set forth. It is apparent, however, that the disclosure may be practiced without these specific details. In some instances, structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used to most effectively convey the substance of their work. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, it is appreciated that throughout the description, discussions utilizing terms such as "identifying", "providing", "enabling", "finding", "selecting" or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus may be specially constructed for the noted purposes, or it may comprise a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations are apparent upon reading and understanding the above description. The scope of the disclosure should, therefore, be determined with reference to the appended claims, along with the full scope of equivalents to which such claims are entitled.

What is claimed is:

1. A method comprising:
    maintaining, by a processing device executing a unified storage manager (USM), a set of configuration files, each configuration file of the set of configuration files to support a respective storage service of a plurality of disparate storage services that are executed and managed as separate processes by the USM, wherein each storage service of the plurality of disparate storage services provides a scalable and distributed file system of a plurality of file systems that manage computer storage space;
    receiving, by the processing device, an update package comprising a configuration file for a new storage service to add to the USM;

adding, by the processing device, the configuration file to the set of configuration files maintained by the USM;

responsive to detecting the addition of the configuration file, causing, by the processing device, a re-load of the set of configuration files at the USM without a shutdown and re-start of the USM;

loading, by the processing device, the configuration file in the USM; and initializing, by the processing device in view of the loaded configuration file, an adaptor component for the storage service at the USM, the adaptor component comprising a set of application programming interface (API) methods for the USM to communicate with the new storage service.

2. The method of claim 1, wherein the update package is an RPM package.

3. The method of claim 1, wherein loading the configuration file comprises executing binaries corresponding to the configuration file in the USM.

4. The method of claim 3, wherein the binaries cause the adaptor component to initialize on the USM and wherein the binaries comprise the set of API methods for the new storage service.

5. The method of claim 1, wherein the adaptor component corresponding to the new storage service comprises a plugin component that enables the USM to manage the new storage service.

6. The method of claim 1, wherein the API methods comprising remote procedure call (RPC) API methods.

7. The method of claim 1, wherein the adaptor component is removed from the USM by deleting the configuration file from the USM.

8. The method of claim 7, wherein a re-load of the set of configuration files subsequent to deleting the configuration file causes removal of the adaptor component without a shutdown and restart of the USM.

9. A non-transitory computer-readable medium having instructions stored therein that, when executed by a processing device, cause the processing device to:

maintain, by the processing device executing a unified storage manager (USM), a set of configuration files, each configuration file of the set of configuration files to support a respective storage service of a plurality of disparate storage services that are executed and managed as separate processes by the USM, wherein each storage service of the plurality of disparate storage services provides a scalable and distributed file system of a plurality of file systems that manage computer storage space;

add, by the processing device, a configuration file to the set of configuration files maintained by the USM, the configuration file received as part of an update package for the USM and corresponding to a new storage service;

detect, by the processing device, a change to the set of configuration files responsive to adding the configuration file;

re-loading, by the processing device, the set of configuration files at the USM without a shutdown and re-start of the USM, the re-loading comprising loading the configuration file in the USM; and responsive to loading the configuration file, initialize, by the processing device in view of the loaded configuration file, an adaptor component for the storage service at the USM, the adaptor component comprising a set of application programming interface (API) methods for the USM to communicate with the new storage service.

10. The non-transitory computer-readable medium of claim 9, wherein the update package is an RPM package.

11. The non-transitory computer-readable medium of claim 9, wherein the processing device to load the configuration file further comprises the processing device to execute binaries corresponding to the configuration file in the USM.

12. The non-transitory computer-readable medium of claim 11, wherein the binaries cause the adaptor component to initialize on the USM and wherein the binaries comprise the set of API methods for the new storage service.

13. The non-transitory computer-readable medium of claim 9, wherein the adaptor component corresponding to the new storage service comprises a plugin component that enables the USM to manage the new storage service.

14. The non-transitory computer-readable medium of claim 9, wherein the adaptor component is removed from the USM by deleting the configuration file from the USM.

15. The non-transitory computer-readable medium of claim 14, wherein a re-load of the set of configuration files subsequent to the processing device deleting the configuration file causes removal of the adaptor component without a shutdown and restart of the USM.

16. A system comprising:

a memory to store a rule set for a storage service managed by a unified storage managed (USM), the storage service comprising a scalable and distributed file system, wherein the USM to manage a plurality of disparate storage services that each provide a different file system of a plurality of file systems that manage computer storage space, the plurality of disparate storage services each executed and managed as separate processes by the USM; and a processing device communicably coupled to the memory, the processing device to:

maintain a set of configuration files, each configuration file of the set of configuration files to support a respective storage service of the plurality of disparate storage services;

receive an update package comprising a configuration file for a new storage service to add to the USM;

add the configuration file to the set of configuration files maintained by the USM;

detecting the addition of the configuration file;

causing, in response to the detecting, a re-load of the set of configuration files at the USM without a shutdown and re-start of the USM;

installing binaries corresponding to the configuration file in the USM; and response to installation of the binaries, initializing a plugin component for the storage service at the USM, the plugin component comprising a set of application programming interface (API) methods for the USM to communicate with the new storage service.

17. The system of claim 16, wherein the plugin component corresponding to the storage service enables the USM to manage the new storage service.

18. The system of claim 16, wherein the API methods comprising remote procedure call (RPC) API methods.

19. The system of claim 16, wherein the plugin component is removed from the USM by deleting the configuration file from the USM.

20. The system of claim 19, wherein a re-load of the set of configuration files subsequent to deleting the configuration file causes the plugin component is removed without a shutdown and restart of the USM.

\* \* \* \* \*